91-417 SR
4/7/87 OR H 000,249

United States Statutory Invention Registration [19]

[11] Reg. Number: H249
[43] Published: Apr. 7, 1987

Welford

[54] DUAL RATE ACTUATOR

[75] Inventor: Gordon D. Welford, Huntsville, Ala.

[73] Assignee: The United States of America as represented by the Secretary of the Army, Washington, D.C.

[21] Appl. No.: 919,992

[22] Filed: Oct. 7, 1986

[51] Int. Cl.[4] ..... F15B 15/17; F15B 11/08; F15B 13/04

[52] U.S. Cl. ..... 91/417 R; 91/448; 91/463; 91/469

*Primary Examiner*—Charles T. Jordan
*Attorney, Agent, or Firm*—John C. Garvin, Jr.; Freddie M. Bush; Terry B. Morris

[57] ABSTRACT

Two solenoid controlled ball valves are employed in such a way that dual flow rate control is provided to a missile control vane actuator. The result is the superior performance of an open center valve actuator over that of a closed center valve actuator with gas consumption savings approaching that of the closed center valve design and having the same complexity as a closed center design.

2 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

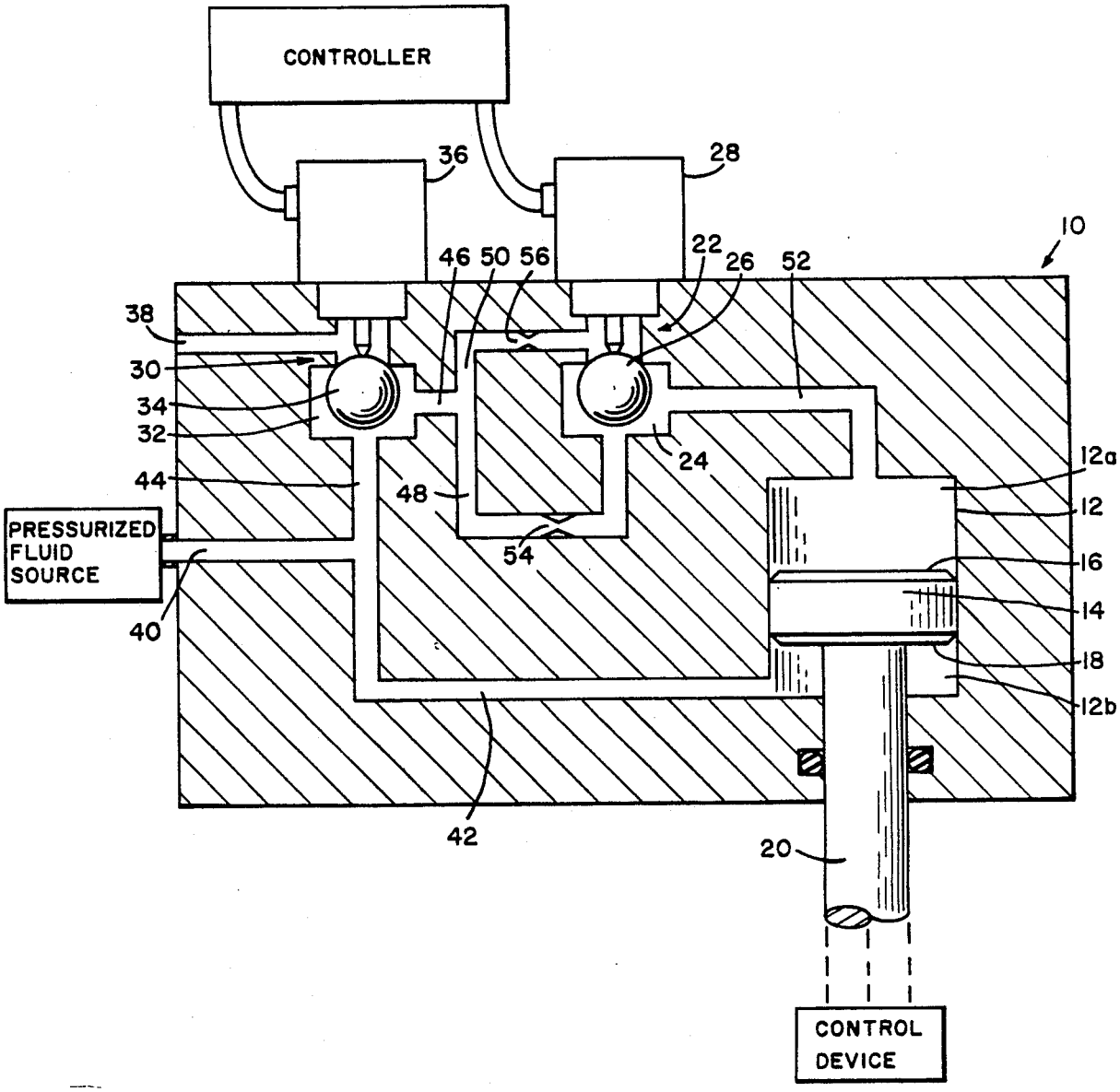
CONTROLLER
36
28
10
46 50 56
22
26
52
38
30
34
32
24
12a
44
48
12
PRESSURIZED FLUID SOURCE
54
16
14
40
18
12b
42
20
CONTROL DEVICE

DUAL RATE ACTUATOR

DEDICATORY CLAUSE

The invention described herein may be manufactured, used, and licensed by or for the Government for governmental purposes without the payment to me of any royalties thereon.

BACKGROUND OF THE INVENTION

In a control system, actuators driven by hydraulic or pneumatic fluids might be used. As an example, a pneumatic actuator in a guided missile may be employed to move air vane control surfaces, or jet vane control surfaces, or swivel nozzles. A valve, such as a solenoid ball valve, controls the fluid flow to the actuator control chamber for work on the large area piston of a dual piston design or the large area, low pressure side of a single piston. The solenoid ball valve used for this purpose may be either an opened center valve or a closed center valve.

The opened center valve design has a large, constant gas flow rate. In a typical missile system the opened center valve design requires only one solenoid valve per actuator, whereas the closed center valve design requires two solenoids. However, the closed center valve requires much less gas to operate in a typical duty cycle of operation. The closed center valve has a performance deadzone causing some small signal performance degradation. The only gas flow requirement for the closed center valve is during piston displacement. Consequently, there is a trade-off in choosing between the valve system performances and the amounts of actuating fluid used during performance. Design requirements for use of such valve systems in guided missiles accentuate a need to minimize actuating fluid mass and storage volume.

SUMMARY OF THE INVENTION

A dual rate actuator which employs two solenoid valves coupled in series in such a way that dual flow rate capability is provided to a missile control system actuator. A first solenoid valve determines the fluid flow direction through the actuator body to control piston movement in two directions to displace control devices of a missile. The second solenoid valve determines the fluid flow through a choice of effective orifices in the actuator body, which regulates the fluid flow rate for a given working pressure.

DESCRIPTION OF THE DRAWING

The single FIGURE is a sectional view of an embodiment of the dual rate actuator.

DESCRIPTION OF THE PREFERRED EMBODIMENT

Referring now to the drawing, the single FIGURE discloses a missile control vane actuator representative of a control actuator which incorporates solenoid controlled ball valves providing dual rate control of a fluid motor.

Typically, actuator 10 is comprised of a control chamber 12, which is divided into upper control chamber 12*a* and lower control chamber 12*b* by piston 14. Piston 14 has upper piston surface 16 and lower piston surface 18, the former's area being greater than the latter's area. Piston 14 is connected through piston rod 20 to a control device. Actuator 10 is also comprised of solenoid actuated ball poppet valves 22 and 30. Solenoid actuated ball poppet valve 22 is comprised of valve chamber 24, poppet ball 26 and solenoid 28. Solenoid actuated ball poppet valve 30 is comprised of valve chamber 32, poppet ball 34 and soleniod 36. Actuator 10 has outlet passage 38, which is connected to valve chamber 32, and inlet passage 40, which is connected to a pressurized fluid source. Actuator 10 also has a plurality of passages numbered 42, 44, 46, 48, 50 and 52. Inlet passage 40 branches into passage 42, which connects to lower control chamber 12*b*, and passage 44, which connects to valve chamber 32. Passage 46 connects to valve chamber 32 and branches into passages 48 and 50, both of which connect to valve chamber 24. Orifices 54 and 56, located in passages 48 and 50 respectively, are of different effective crosssectional areas thereby permitting coarse and vernier adjustment to fluid flow. Passage 52 connects valve chamber 24 and upper control chamber 12*a*.

When solenoid actuated ball poppet valve 30 is not energized, poppet ball 34 closes the connection between passage 38 and valve chamber 32, thereby permitting fluid flow from passage 44 through valve chamber 32 into passages 46, or conversely. When solenoid actuated poppet ball valve 30 is energized, poppet ball 34 closes the connection between valve chamber 32 and passage 44, permitting flow from passage 46 through valve chamber 32 into passage 38, or conversely.

Similarly, when solenoid actuated ball poppet valve 22 is not energized, poppet ball 26 closes the connection between valve chamber 24 and passage 50, thereby permitting fluid flow from passage 48 through valve chamber 24 into passage 52, or conversely. When solenoid actuated ball poppet valve 22 is energized, poppet valve 26 closes the connection between valve chamber 24 and passage 48, permitting fluid flow from passage 50 through valve chamber 24 into passage 52, or conversely.

During operation, fluid is delivered from a pressurized fluid source through passages 40 and 42 into lower control chamber 12*b*, pressuring lower piston surface 18. Depending on the energization state of solenoid 36, either fluid also flows from the pressurized fluid source through valve chambers 32 and 24 and various connecting passages to upper control chamber 12*a* or fluid flows from upper control chamber 12*a* through valve chamber 24 and 32 and various connecting passages to passage 38 to exhaust, effecting in either case a pressure on upper control surface 16. The speed of this fluid flow is governed by the energization state of solenoid 28. When solenoid 28 is unenergized, poppet ball 26 closes passage 50 and fluid flow is through orifice 54. When solenoid 28 is energized, poppet ball 26 closes passage 48 and fluid flow is through orifice 56.

Movement of piston 14 is effected by the pressure forces on upper piston surface 16 and lower piston surface 18. The force transmitted by piston 14 and piston rod 20 outputs a driving force to a load circuit, such as a crank arm connected to a missile control device, e.g., an air vane control surface. Typically, sensors (not shown) are used to determine the error in the missile control device. An error signal is coupled from the sensor to a controller (not shown). The controller, in accord with a predetermined control strategy, then directs movement of the actuator piston 14 and piston rod 20 to reduce or eliminate the existing error. The direction of piston 14 movement is controlled by the controller input signal to solenoid 36 and the speed of movement is controlled by the input signal to solenoid 28. The control strategy is processed so that when the magnitude of error exceeds a predetermined maximum, fluid flow will be through the larger of orifice 54 and orifice 56. When error magnitude is less than the maximum, flow is through the smaller vernier orifice. Also, when the error is at zero, there will be no loss of pressurized fluid through passage 38. Thus, the dual rate actuator provides output correctional signals while using a relatively small loss of fluid.

Although the present invention has been described with reference to the preferred embodiments, workers skilled in the art will recognize that changes may be made in form and detail without departing from the spirit and scope of the foregoing disclosure. Accordingly, the scope of the invention should be limited only by the claims appended hereto.

I claim:

1. An actuator having a piston for providing a linear reciprocating motion comprising:

an actuator body having an inlet port, an outlet port, a control chamber, a first valve chamber, a second valve chamber, and means for interconnecting in series said first and second valve chambers to permit fluid flow therebetween; said piston having an upper piston surface and a lower piston surface of smaller area than said upper piston surface, said piston dividing said control chamber into an upper control subchamber bounded in part by said upper piston surface and a lower control subchamber bounded in part by said lower piston surface, the respective volume of said subchambers varying with displacement of said piston; said inlet port and said outlet port being connected by a plurality of passageways to said first valve chamber to permit fluid flow therebetween, said inlet port further connected to a source of pressurized fluid and to said lower control subchamber for directing fluid to said lower piston surface; said first and second valve chambers having solenoid actuated ball poppet valves therein, said second control valve further being connected by a passageway to said upper control subchamber, whereby said fluid being selectively directed into and out of said upper subchamber in response to selective activation and deactivation of said solenoid actuated valves to create a pressure differential across said piston for variable rate displacement of said piston.

2. An actuator as set forth in claim 1, wherein said means for interconnecting in series said first and second valve chambers to permit fluid flow therebetween comprises:

a branched pipe connected to the first valve and branched into two branches of pipes at the other end, said first branch being connected to said second valve and containing a first orifice, said second branch being connected to said second valve and containing a second orifice differing in flow-resisting characteristic from said first orifice, whereby fluid flow is directed through one or the other of said orifices depending upon the operation of said second valve.

* * * * *